(12) United States Patent
Carlson

(10) Patent No.: US 6,374,082 B1
(45) Date of Patent: Apr. 16, 2002

(54) RF WIRELESS COMMUNICATION SYSTEM OPERATING IN PERIODIC NOISE ENVIRONMENTS

(75) Inventor: Grant B. Carlson, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/392,881

(22) Filed: Sep. 9, 1999

Related U.S. Application Data

(63) Continuation of application No. 09/089,204, filed on Jun. 2, 1998, now abandoned.

(51) Int. Cl.[7] ................................................. H04Q 7/20
(52) U.S. Cl. ......................... 455/63; 455/425; 455/426; 455/454; 455/501; 455/502
(58) Field of Search ............................... 455/423, 424, 455/425, 426, 454, 455, 501, 502, 62, 63, 67.1, 67.3, 67.5

(56) References Cited

U.S. PATENT DOCUMENTS

| 5,463,657 | A |   | 10/1995 | Rice |        |
|-----------|---|---|---------|------|--------|
| 5,504,774 | A |   | 4/1996  | Takai et al. | |
| 5,574,979 | A | * | 11/1996 | West | 455/63 |
| 5,594,944 | A | * | 1/1997  | Ogata et al. | 455/62 |
| 5,724,155 | A |   | 3/1998  | Saito | |
| 5,745,484 | A |   | 4/1998  | Scott | |
| 5,862,452 | A |   | 1/1999  | Cudak et al. | |
| 5,903,819 | A | * | 5/1999  | Romesburg | 455/63 |
| 5,974,081 | A |   | 10/1999 | Rosas et al. | |
| 6,006,071 | A | * | 12/1999 | Roberts et al. | 455/63 |
| 6,058,106 | A | * | 5/2000  | Cudak et al. | 370/313 |

* cited by examiner

*Primary Examiner*—Daniel Hunter
*Assistant Examiner*—Yemane Woldetatios
(74) *Attorney, Agent, or Firm*—Thomas H. Close

(57) ABSTRACT

An RF wireless communication system operating in the presence of a periodic noise environment, includes first and second wireless devices, each such device having: a source of power; a transceiver coupled to the power source, for transmitting and receiving wireless information; a controller/CPU for controlling the operation of the transceiver; means for detecting and mapping the presence of the RF radiated periodic noise; and means responsive to the mapped periodic noise for controlling the operation of the transceiver to communicate with the other wireless device during the quiescent periods of the radiated RF periodic noise.

10 Claims, 3 Drawing Sheets

RF WIRELESS COMMUNICATION SYSTEM OPERATING IN PERIODIC NOISE ENVIRONMENTS

CROSS-REFERENCE TO RELATED APPLICATIONS

This is a continuation of application Ser. No. 09/089,204, filed Jun. 2, 1998 now abandoned, entitled "Wireless Communication System Operating in 2.4 to 2.5 GHz Band", by Grant Carlson.

FIELD OF THE INVENTION

This invention relates to a digital wireless wideband RF communication system operating in periodic noise environments. Such a system is useful, for example, for communicating digital data at high data rates; e.g. rates greater than 1 Mega bits per second (Mbps).

BACKGROUND OF THE INVENTION

With the advent of digital photography, the wireless transmission of digital images, for example between a portable transmitting device like a digital camera and a receiving device such as a personal computer or other image appliance such as a printer, has become a desirable feature. High data rate transmissions are desirable because digital images represent a large amount of data and short transmission times are needed. Short transmission times result in shorter wait times while an image is being transferred from a camera to a receiver and in reduced battery power consumption.

Although there are several useful communication bands available for such a digital communication system, the 2.4 to 2.5 GHz ISM Band is particularly attractive because the band is unlicensed and available internationally. However, a major problem exists with the use of this band for wireless communication. The band is allocated for microwave ovens and other devices, which as described below, generate a great deal of periodic noise in the band.

Radio frequency (RF) transmissions in the 2.4 to 2.5 GHz ISM Band have historically had to deal with the presence of manmade noise from microwave ovens that predominately operate in the center of this band at 2.45 GHz. The noise emanates from the oven by leakage through the enclosure of the oven. The leakage noise is periodic and has a radiated output power approximately 20 dB greater in strength than that allowed by the FCC for operation of Part 15 non spread spectrum radios. With over 200 million microwave ovens in use throughout the world, they are by far the greatest and most significant source of noise in this band. In addition microwave lighting/illumination systems are soon to be in use in the same band creating additional noise interference. Some examples of locations where it would be desirable to transmit images in the presence of periodic microwave noise are in the home (particularly in the kitchen), or in a supermarket or department store where a photo kiosk may be located near a microwave oven or lighting system.

One possible way to avoid the microwave is to use a spread spectrum communication technique. One type of spread spectrum technique spreads the signal over a band which is much larger than the bandwidth of the signal so that the narrow band noise from the noise source has a reduced effect on the demodulated signal to noise ratio. This technique however is relatively expensive to implement, significantly limits the data throughput (e.g. by a factor of 8 or more) and does not work well if the receiver is located very close to the noise source. Another way to avoid the noise described is demonstrated in U.S. Pat. No. 5,574,979, issued Nov. 12, 1996 to West, entitled "Periodic Interference Avoidance in a Wireless Radio Frequency Communication System". This patent demonstrates a potential solution by avoiding microwave oven periodic noise by sensing the periodicity of the AC power line main in which the oven is connected to. Unfortunately this technique does not work for periodic noise sources other than microwave ovens or in cases where multiple microwave noise sources on different phases exist. This technique also does not work in cases where the RF communication equipment is battery powered and no connection to an AC power main can be made, nor can the AC main E field radiation be received by the RF communication equipment.

There is a need therefore for an improved means of digital communication in environments with periodic noise and particularly those environments involving the 2.4 to 2.5 GHz ISM band.

SUMMARY OF THE INVENTION

The problem is solved according to the present invention by providing a digital communication system that can communicate in the presence of periodic noise by detecting the quiescent periods in the periodic RF radiated noise emissions and mapping and storing the envelope of this noise. The communication system then uses the internally stored mapped noise envelope to correctly time all communication such that digital data is sent only during the quiescent periods of the noise.

ADVANTAGES OF THE INVENTION

The advantages of the present invention are:

1. The RF link does not have to change frequency or use any correlation techniques in order to mitigate the periodic noise.
2. The software and clock synchronization circuitry required to execute the off duty cycle transfer has significant cost savings and smaller size requirements than the expensive and bulky circuitry currently used for the prior art spread spectrum techniques described above.
3. During the presence of 50% duty cycle periodic noise, image data transfer can be maintained at an average rate of approximately one half the normal through put rate.
4. The system can be battery powered and need have no connection in any way to an AC main in order to obtain the appropriate timing for periodicity.

DETAILED DESCRIPTION OF THE INVENTION

Figure 1:
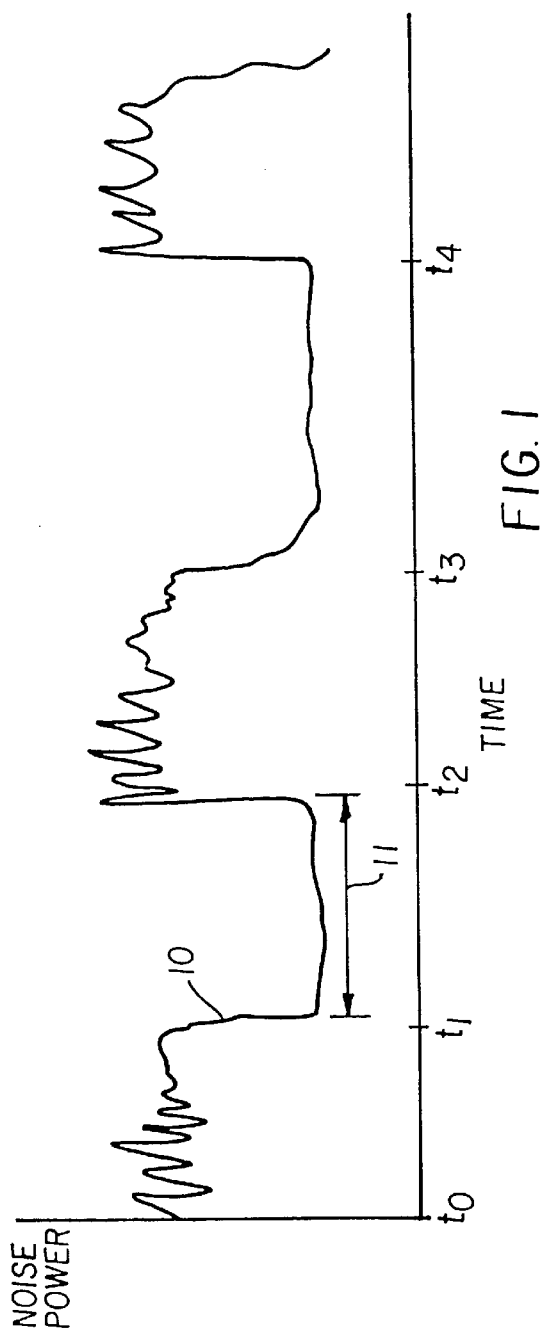
FIG. 1 is a plot of RF noise produced by a periodic noise source.

In addressing the above problem, it is understood that the noise produced by a periodic noise source has some duty cycle less than 100%. Referring to FIG. 1, the noise energy waveform 10 produced by a periodic noise with 50% duty cycle is shown. The source of the RF noise energy for example could be a magnetron within the microwave oven, which is driven by the AC power line. The noise source could also be a lightning system or even other AM modulated communications systems with duty cycles less than 100%. According to the present invention, this periodic noise is detected and communication is conducted during the quiescent periods, that is during the periods 11 when the noise is off.

Figure 2:
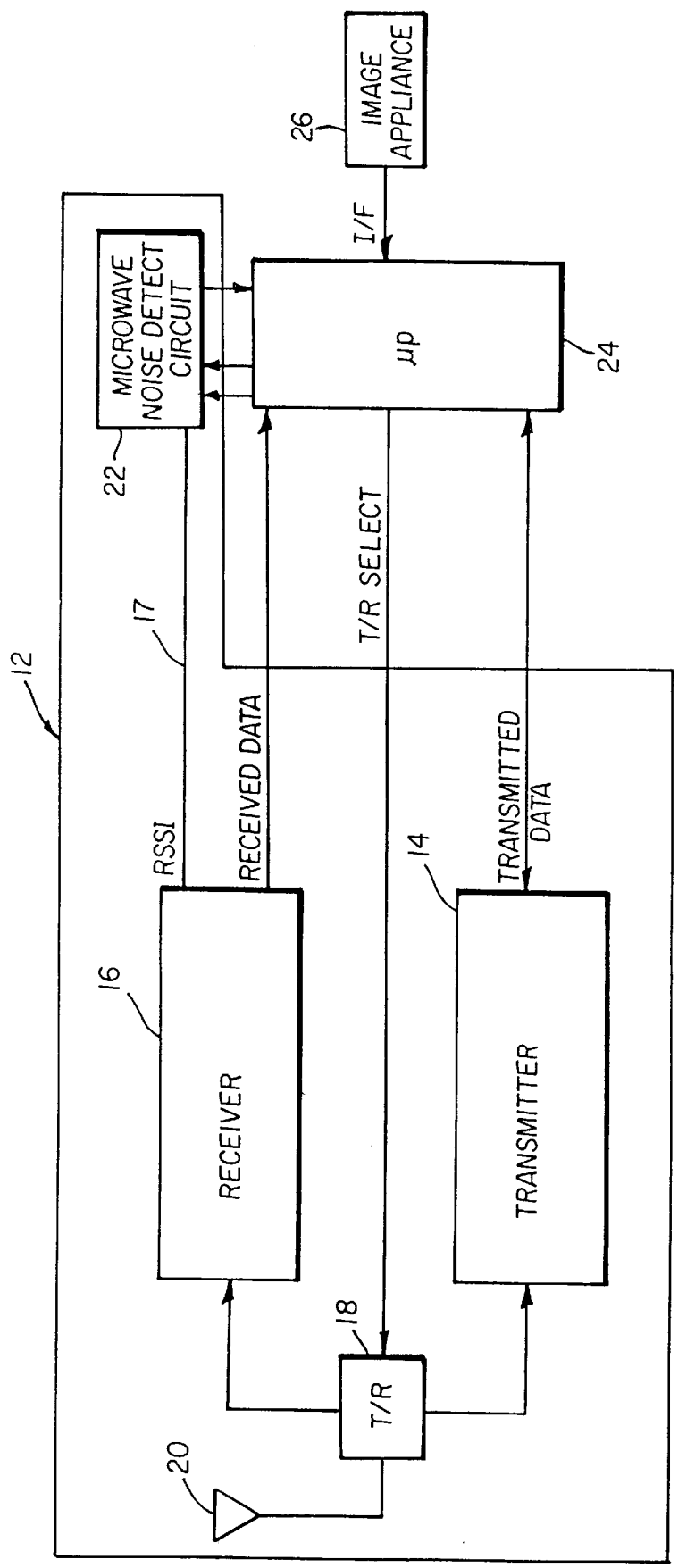
FIG. 2 is a block diagram of a transceiver according to the present invention.

Referring to FIG. 2, a system for communicating digital data according to the present invention includes a transceiver 12 for communicating in the presence of periodic noise. The transceiver includes a transmitter 14, a receiver 16, and a transmit/receive switch 18 that selectively connects an antenna 20 to the transmitter or the receiver. The transmitter 14 employs a standard modulation scheme such as FSK or QPSK. The receiver 16 is a standard receiver with the capability of demodulating a FSK or a QPSK signal for example. The demodulator in the receiver 16 is for example a Motorola MC13155 integrated circuit. The transceiver 12 also includes a periodic noise detect circuit 22 connected to the RSSI 17 (Receive Signal Strength Indicator) of the receiver 16. An AM detector output on the receiver could also be used.

The transceiver 12 is controlled by a microprocessor 24. The microprocessor 24 may for example be a microprocessor that is also used to control an image appliance 26 (i.e. camera, printer, kiosk, or personal computer), or may be a microprocessor that is specifically supplied with the communication system. The microprocessor 24 controls the transmit/receive switch 18, prepares the data from the image appliance 26 to be transmitted by transmitter 14, and receives the data from the receiver 16 to supply received data to the image appliance 26.

Figure 3:
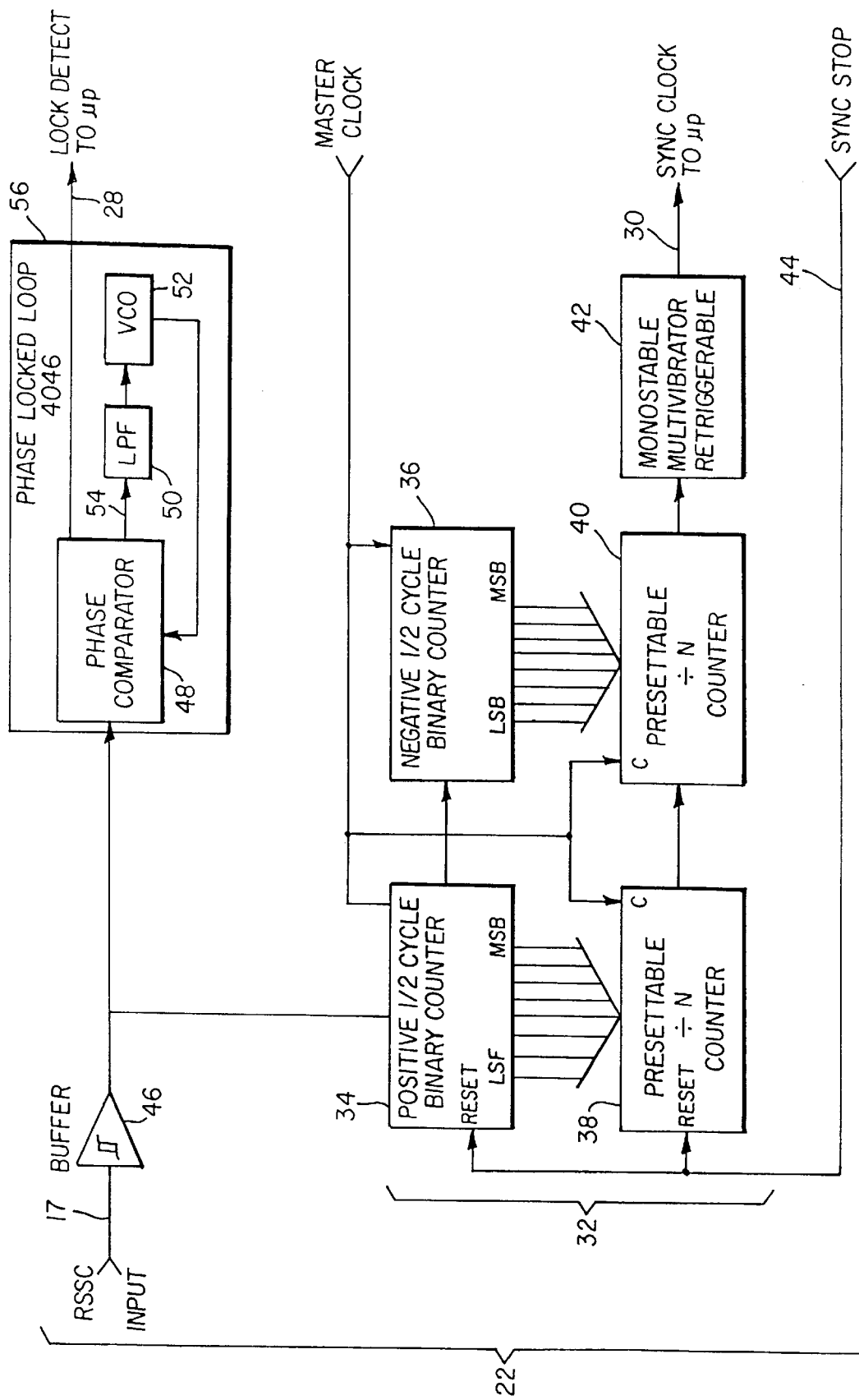
FIG. 3 is a block diagram of the noise detection circuit.

Referring to FIG. 3, periodic noise detect circuit 22 uses the RSSI signal 17 (or an AM demodulated signal) from the receiver 16 to generate a sync clock 30 and a Lock detect 28 signal as described below, which are supplied to the microprocessor 24 for controlling the communication of data during quiescent periods in the noise 10. The main function of this circuitry 22 is to lock on to the envelope of the periodic noise 10 using an AM detector or the RSSI circuitry (not shown) to generate a Lock detect signal 28 and a synchronization (Sync) clock 30 for the microprocessor.

The Lock detect signal 28 informs the microprocessor 24 that a periodic noise signature is present. To generate the Lock detect signal 28, the AM demodulated signal or RSSI 17 input signal coming from the receiver is first buffered 46 and provided both to a phase locked loop circuit 56 and sync clock generator circuitry 32. The phase locked loop circuit 56 consists of a Voltage Controlled Oscillator (VCO) 52, a Phase Comparator 48 that produces a phase error output signal 54 and a Low Pass loop Filter (LPF) 50. The circuit shown is designed to provide a Lock detect signal 28 if it is supplied with a periodic AM demodulated or RSSI signal 17. The circuit is commercially available in integrated circuit form from manufacturers such as Motorola. A commonly used part number is 74HC4046.

Figure 4:
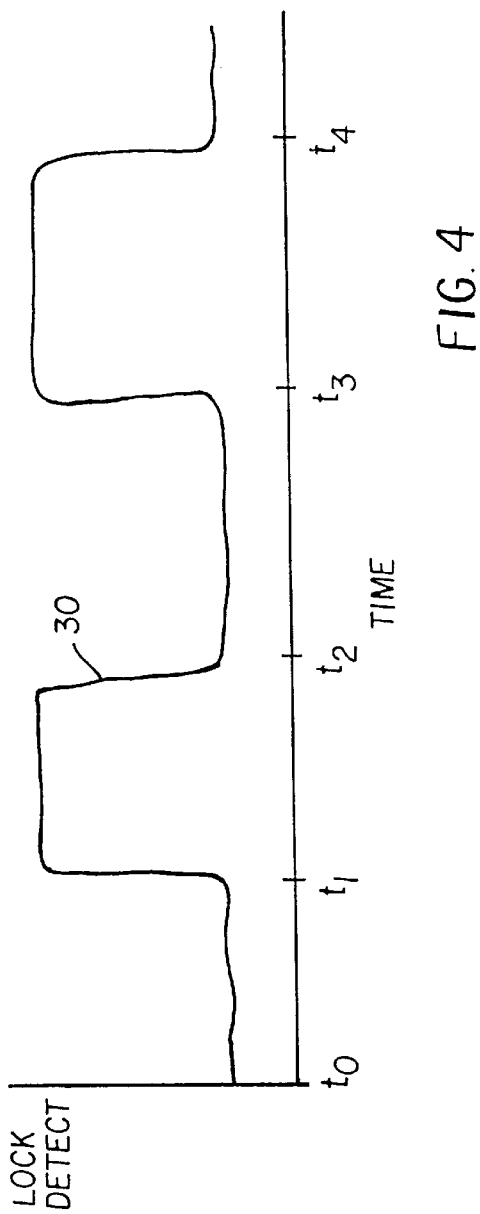
FIG. 4 is a plot of the noise envelope sync clock signal generated by the periodic noise detection circuitry.

FIG. 4 shows the Sync clock signal 30 referenced to the periodic noise energy in FIG. 1. Sync clock signal 30 is generated separately from Lock detect signal 28 using sync clock generator circuitry 32. Sync clock signal 30 is mapped identical to the AM demodulated or RSSI 17 signal in its pulse width, frequency and duty cycle. This mapping is used to predict when the periodic noise will be in the quiescent state. This detect, mapping and storage process is necessary since the AM demodulated or RSSI 17 signal will not be able to separate the periodic noise from the transceiver activity, once data communications commences. Binary counters 34, 36 sample the AM demodulated or RSSI 17 high and low periods and load the result into pre-setable counters 38, 40 for storage. Once the data is loaded, the Sync clock 30 is generated by a monostable multivibrator 42 without the periodic noise envelope provided by the AM demodulated or RSSI signal 17. The Sync clock 30 is provided to the microprocessor 24 and is used to enable the transmitting of the image data only during the predicted quiescent or "off" periods 11 in the periodic noise signature or envelope. The Sync clock 30 continues to run until the microprocessor determines it is no longer needed, or that it has drifted or shifted in phase. The microprocessor then signals the Sync clock to stop using the Sync stop control signal 44.

Phase shifting can be caused for example by noise from multiple microwave ovens or lighting systems on different power phases. If three ovens are on simultaneously using three different AC phases, the AM demodulated or RSSI signal will be high for the entire duty cycle and there will be no Lock detect signal 28 generated. The microprocessor 24 will cause the transceiver to search for a quiet channel. Once a lock is established however, the microprocessor 24 knows when to stop using the Sync clock either when the receiver at the far end signals the transmitter that the periodic noise has stopped and it has verified the noise has stopped by listening, or its Lock detect 28 goes high again synchronous with the Sync clock signal 30, indicating that the noise is gone, and the transmitter is causing its own lock detect signal. This approach works for different periodic noise sources so long as the duty cycle of the periodic noise is less than 100%.

The invention has been described in detail with particular reference to certain preferred embodiments thereof, but it will be understood that variations and modifications like the use of a DSP to perform the mapping and storing function can be effected within the spirit and scope of the invention.

PARTS LIST 10 periodic noise energy waveform
11 quiescent (off) period
12 transceiver
14 transmitter
16 receiver
17 Receive Signal Strength Indicator (RSSI)
18 transmit/receive switch
20 antenna
22 periodic noise detect circuit
24 microprocessor
26 imaging appliance
28 Lock detect signal
30 Sync clock signal
32 Sync clock mapping and storing circuitry
34 binary counter
36 binary counter
38 pre-setable counter
40 pre-setable counter
42 monostable multivibrator
44 Sync Stop signal
46 buffer
48 phase comparator
50 low pass loop filter
52 Voltage Controlled Oscillator
54 phase error signal
56 phase locked loop

What is claimed is:

1. An RF wireless communication system operating in the presence of a periodic noise environment, comprising first and second wireless devices, each such device including:

i) a source of power;

ii) a transceiver coupled to the power source, for transmitting and receiving wireless information;

iii) a controller/CPU for controlling the operation of the transceiver;

iv) means in the transceiver for receiving radiated RF periodic noise and for detecting and mapping the radiated RF periodic noise, including means for mapping storing and generating a sync signal which represents the envelope of the periodic noise source and its quiescent period signature, and means for continuing to generate the sync signal even when the radiated periodic noise is no longer detectable, and v) means responsive to the mapped radiated RF periodic noise for controlling the operation of the transceiver to communicate with the other wireless device during the quiescent periods of the radiated RF periodic noise, including means for enabling the transmitter to transmit when it predicts the periodic noise is in the quiescent state, thereby making the transmission process efficient.

2. The RF wireless communication system of claim 1, wherein each device further includes a microprocessor/CPU having memory for storing data and for controlling the operation of the transceiver to cause it to transmit or receive data from the memory.

3. The wireless communication system claimed in claim 1, wherein the means for detecting the quiescent periods in the RF radiated periodic noise further comprises:

a) means for detecting the amplitude of the periodic noise energy; and b) means for recognizing the periodic characteristics of radiated noise energy from a detected amplitude.

4. A method of operating a wireless communication system in the presence of periodic noise, the system including a source of power; a transceiver coupled to the power source, for transmitting and receiving wireless information; and a controller/CPU for controlling the operation of the transceiver, comprising the steps of:

a) detecting radiated RF periodic noise with the transceiver and mapping the RF radiated periodic noise;

b) mapping storing and generating a sync signal which represents the envelope of the periodic noise source and its quiescent period signature;

c) continuing to generate the sync signal even when the radiated periodic noise is no longer detectable; and d) controlling the operation of the transceiver in response to the mapped radiated RF periodic noise to communicate with the other wireless device during the quiescent periods of the radiated RF periodic noise by enabling the transmitter to transmit when it predicts the periodic noise is in the quiescent state, thereby making the transmission process efficient.

5. The method of operating a wireless communication system of claim 4, wherein each device further includes a microprocessor/CPU having memory for storing data, and further comprising the step of controlling the operation of the transceiver to cause it to transmit or receive data from the memory.

6. The method of operating a wireless communication system claimed in claim 5, wherein the step of detecting the quiescent periods in the RF radiated periodic noise further comprises:

a) detecting the amplitude of the periodic noise energy; and b) recognizing the periodic characteristics of radiated noise energy from a detected amplitude.

7. An RF wireless transceiver for operating in the presence of radiated RF periodic noise, comprising:

a) a receiver for receiving a wideband RF signal;

b) a transmitter for transmitting a wideband RF signal;

c) an antenna connectable to the receiver and transmitter;

d) a periodic noise detect circuit connected to the receiver for generating a sync clock by locking onto the envelope of radiated RF periodic noise received by the receiver the noise detect circuit including means for mapping storing and generating a sync signal which represents the envelope of the periodic noise source and its quiescent period signature, and means for continuing to generate the sync signal even when the radiated periodic noise is no longer detectable,; and e) a microprocessor controller connected to the receiver, transmitter and periodic noise detect circuit for controlling the operation of the transceiver during quiescent periods of the radiated RF periodic noise by enabling the transmitter to transmit when it predicts the periodic noise is in the quiescent state, thereby making the transmission process efficient.

8. The RF wireless transceiver claimed in claim 7, wherein the receiver supplies an RSSI signal to the periodic noise detect circuit.

9. The RF wireless transceiver claimed in claim 7, wherein the receiver supplies an AM demodulated signal to the periodic noise detect circuit.

10. The RF wireless transceiver claimed in claim 7, wherein the antenna is connectable through a transmit/receive switch.

* * * * *